US011116061B2

(12) United States Patent
Sagawa (10) Patent No.: US 11,116,061 B2
(45) Date of Patent: Sep. 7, 2021

(54) LIGHT SOURCE DRIVING DEVICE (71) Applicant: MINEBEA MITSUMI Inc., Nagano (JP)

(72) Inventor: Yoshihiro Sagawa, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 55 days.

(21) Appl. No.: 16/419,335

(22) Filed: May 22, 2019

(65) Prior Publication Data

US 2019/0274200 A1    Sep. 5, 2019

Related U.S. Application Data

(63) Continuation of application No. PCT/JP2017/031843, filed on Sep. 4, 2017.

(30) Foreign Application Priority Data

Nov. 30, 2016    (JP) .............................. JP2016-233148

(51) Int. Cl.
*H05B 47/16*    (2020.01)
*H05B 45/10*    (2020.01)
(Continued)

(52) U.S. Cl.
CPC .............. *H05B 47/16* (2020.01); *H05B 45/10* (2020.01); *H05B 47/155* (2020.01);
(Continued)

(58) Field of Classification Search
CPC ........ H05B 45/10; H05B 47/10; H05B 47/16; H05B 47/155; Y02B 20/46
(Continued)

(56) References Cited

U.S. PATENT DOCUMENTS 9,775,216 B2    9/2017    Szczerba et al.
9,907,141 B2    2/2018    Shigezane et al.
(Continued)

FOREIGN PATENT DOCUMENTS

DE    10 2006 028 670 A1    12/2007
DE    10 2012 007 017 A1    10/2013
(Continued)

OTHER PUBLICATIONS

International Preliminary Report on Patentability Chapter II for corresponding International Application No. PCT/JP2017/031843 dated May 29, 2018.
(Continued)

*Primary Examiner* — Alexander H Taningco
*Assistant Examiner* — Amy X Yang
(74) *Attorney, Agent, or Firm* — Pearne & Gordon LLP (57) ABSTRACT

A light source driving device includes: a storage unit that stores therein three or more combinations of a level indicating brightness of light emitted from a light source, and a control value used when light with brightness corresponding to the level is emitted, the control value having a nonlinear relation with the level; and a control unit that controls the light source so that the brightness of the emitted light is gradually changed to brightness corresponding to a level of a target indicated by a light control instruction signal, by calculating a level indicating the brightness of the emitted light between a level when a light control instruction signal is supplied and the level of the indicated target, by using two or more combinations for calculating the control value corresponding to the calculated level, among the stored combinations.

8 Claims, 5 Drawing Sheets

(51) Int. Cl.
*H05B 47/155* (2020.01)
*H05B 47/165* (2020.01)
*H05B 47/175* (2020.01)

(52) U.S. Cl.
CPC ......... *H05B 47/165* (2020.01); *H05B 47/175* (2020.01); *Y02B 20/40* (2013.01)

(58) Field of Classification Search
USPC .............................. 315/291, 294, 307, 308
See application file for complete search history.

(56) References Cited

U.S. PATENT DOCUMENTS

| | | | |
|---|---|---|---|
| 2001/0022501 A1* | 9/2001 | Pilz .................... | H05B 47/18 315/291 |
| 2009/0167207 A1* | 7/2009 | Zimmermann ........ | H05B 47/18 315/294 |
| 2013/0038219 A1 | 2/2013 | Dau et al. | |
| 2014/0239848 A1* | 8/2014 | Bradford ................ | H05B 45/10 315/307 |
| 2015/0359062 A1 | 12/2015 | Dau et al. | |
| 2016/0029462 A1* | 1/2016 | Koch .................... | H05B 47/16 315/307 |
| 2016/0255692 A1 | 9/2016 | Ohira | |
| 2017/0048945 A1 | 2/2017 | Dau et al. | |
| 2017/0164441 A1* | 6/2017 | Nieuwlands .......... | H05B 47/16 |
| 2017/0290127 A1* | 10/2017 | Shigezane ............ | G09G 3/3413 |
| 2019/0053344 A1 | 2/2019 | Dau et al. | |

FOREIGN PATENT DOCUMENTS

| | | |
|---|---|---|
| DE | 10 2016 102 180 A1 | 8/2016 |
| EP | 1 135 005 A2 | 9/2001 |
| JP | 2001-250697 A | 9/2001 |
| JP | 2001250697 A * | 9/2001 |
| JP | 2012-256533 A | 12/2012 |
| JP | 2014-527268 A | 10/2014 |
| JP | 2015-88412 A | 5/2015 |
| JP | 2015-52595 A | 9/2015 |
| JP | 2015-525955 A | 9/2015 |
| JP | 2016-126868 A | 7/2016 |
| WO | 2014/009861 A2 | 1/2014 |
| WO | 2014/009861 A3 | 1/2014 |

OTHER PUBLICATIONS

International Search Report for corresponding International Application No. PCT/JP2017/031843 dated Oct. 10, 2017.
Written Opinion for corresponding International Application No. PCT/JP2017/031843 dated Oct. 10, 2017.
Extended European Search Report dated May 26, 2020 for corresponding European Application No. 17875958.5.
Chinese Office Action dated Aug. 27, 2020 for corresponding Chinese Application No. 201780072897.0 and English translation.

* cited by examiner

| STAGE | 0 | 1 | 2 | 3 | 4 | 5 | 6 | 7 | 8 | 9 | 10 |
|---|---|---|---|---|---|---|---|---|---|---|---|
| LIGHT CONTROL STEP | 1.0 | 1.2 | 1.4 | 1.6 | 1.8 | 2.0 | 2.2 | 2.4 | 2.6 | 2.8 | 3.0 |
| DUTY | 16.0 | 19.2 | 22.4 | 25.6 | 28.8 | 32.0 | 38.4 | 44.8 | 51.2 | 57.6 | 64.0 |

FIG.8

| STAGE | 0 | 1 | 2 | 3 | 4 | 5 | 6 | 7 | 8 | 9 | 10 |
|---|---|---|---|---|---|---|---|---|---|---|---|
| DUTY | 16.0 | 20.8 | 25.6 | 30.4 | 35.2 | 40.0 | 44.8 | 49.6 | 54.4 | 59.2 | 64.0 |

LIGHT SOURCE DRIVING DEVICE

CROSS-REFERENCE TO RELATED APPLICATION(S)

This application is a continuation of PCT international application Ser. No. PCT/JP2017/031843 filed on Sep. 4, 2017 which designates the United States, and which claims the benefit of priority from Japanese Patent Application No. 2016-233148, filed on Nov. 30, 2016; the entire contents of which are incorporated herein by reference.

BACKGROUND OF THE INVENTION

1. Field of the Invention

The present invention relates to a light source driving device.

2. Description of the Related Art

A method of controlling an illumination device by using a calibrated relation between power consumption and a control voltage to automatically determine the required control voltage, instead of using a linear approximation to obtain a control voltage indicating a desired optical level (for example, see Patent Literature 1) has been known.

In controlling the brightness of light emitted from a light source of an illumination device so as to gradually change (fade control) in patent literature 1 (Japanese Translation of PCT Application Publication No. 2015-525955), a value obtained by proportionally dividing the difference between a control value of the current light control step and a control value of a target light control step by the number of steps during the fade period may be set as a variation in a control value between the light control steps. In other words, a control value obtained by stepwise adding (or subtracting) the proportionally divided variation may be used at each light control step, from the current light control step to the target light control step.

However, it is desirable that the dimming curve of the illumination device is a nonlinear curve (such as a log curve) instead of a linear curve. Thus, in the method of using the control value obtained by stepwise adding (or subtracting) the proportionally divided variation at each light control step as described above, it is difficult to approximate the control value to the nonlinear curve.

Moreover, the fade control may also be performed by storing a control value corresponding to the nonlinear curve in advance in a storage unit such as memory, and using the control value stored in the storage unit. However, to sufficiently approximate the control value to the nonlinear curve, a large number of control values need to be stored in the storage unit. In this case, an expensive storage unit with large storage capacity needs to be used. Consequently, it will lead to increase in cost.

The present invention has been made in view of the above, and an object of the present invention is to provide a light source driving device that can control and gradually change the brightness of light emitted from a light source so that the control value is arranged along a nonlinear curve, while suppressing the increase in cost.

SUMMARY OF THE INVENTION

In order to solve the above-described problems and achieve the object, a light source driving device according to an aspect of the present invention includes a storage unit that stores therein three or more combinations of a level indicating brightness of light emitted from a light source, and a control value used when light with brightness corresponding to the level is emitted from the light source, the control value having a nonlinear relation with the level; and a control unit that controls the light source so that the brightness of the light emitted from the light source is gradually changed to brightness corresponding to a level of a target indicated by a light control instruction signal, by calculating a level indicating the brightness of the light emitted from the light source between a level when a light control instruction signal is supplied and the level of the target indicated by the light control instruction signal during first time period, at each second time period that is shorter than the first time period, by using two or more combinations for calculating the control value corresponding to the level being calculated, among the combinations stored in the storage unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
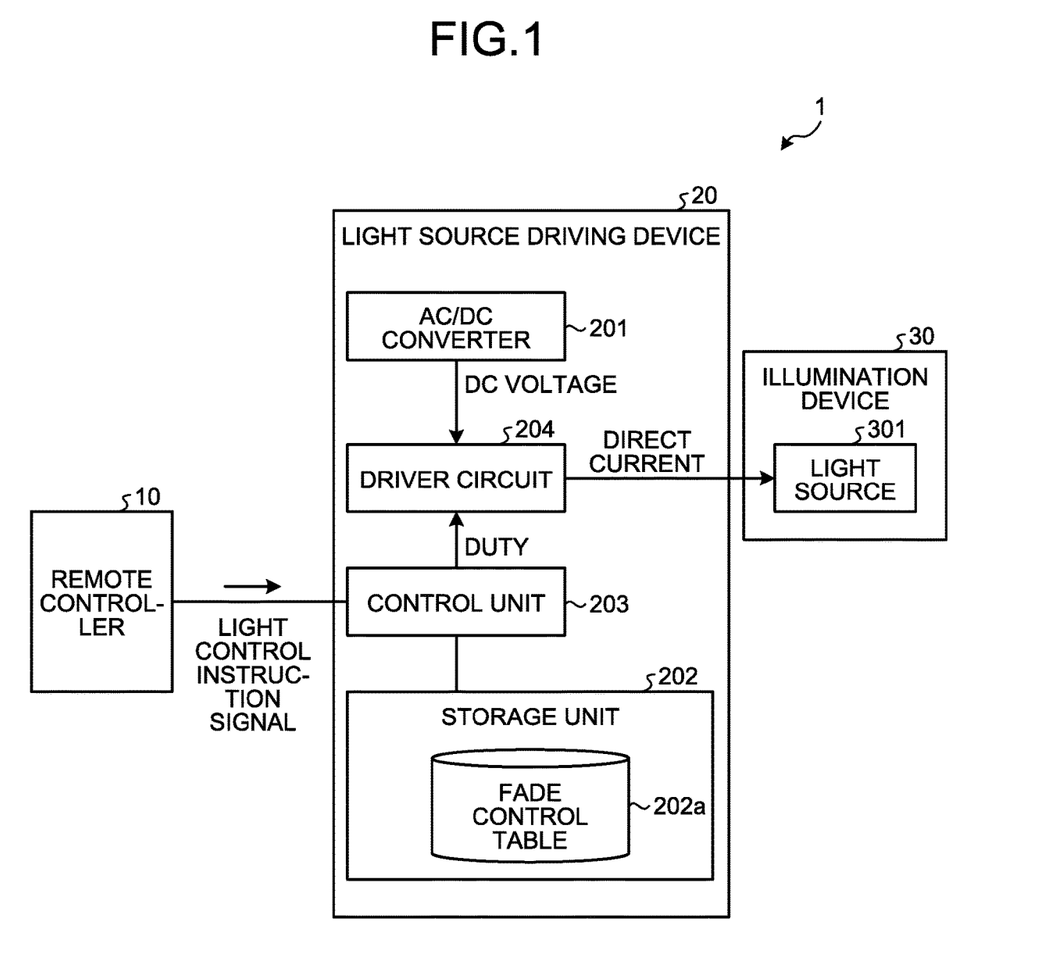
FIG. 1 is a diagram illustrating an example of a configuration of an illumination system according to an embodiment.

Hereinafter, a light source driving device according to an embodiment will be described in detail with reference to the accompanying drawings. FIG. 1 is a diagram illustrating an example of a configuration of an illumination system 1 according to the embodiment.

As illustrated in FIG. 1, the illumination system 1 according to the embodiment includes a remote controller 10, a light source driving device 20, and an illumination device 30.

For example, the remote controller 10 is a terminal such as a smart phone and a tablet terminal. The remote controller 10 transmits a signal for controlling the illumination device 30. For example, the remote controller 10 receives, from a user of the illumination system 1, a target light control step in a dimming curve (such as a log curve) used to perform fade control that controls and gradually (stepwise) changes the brightness of light emitted from the illumination device 30. The remote controller 10 then transmits a light control instruction signal indicating the received target light control step, to the light source driving device 20. The dimming curve will be described below.

The light source driving device 20 controls a light source 301, which will be described below, of the illumination device 30. The light source driving device 20 includes an alternate current (AC)/direct current (DC) converter 201, a storage unit 202, a control unit 203, and a driver circuit 204.

The AC/DC converter 201 converts an AC voltage applied from a commercial power supply, which is not illustrated, to a DC voltage, and applies the DC voltage to the driver circuit 204.

For example, the storage unit 202 is implemented by a storage device such as a read only memory (ROM) and a hard disk drive (HDD). The storage unit 202 according to the embodiment stores therein a fade control table 202a. The fade control table 202a will be described below.

For example, the control unit 203 is implemented by a microcomputer including a central processing unit (CPU) and the like. The control unit 203 transmits duty indicating the brightness of light emitted from the light source 301, which will be described below, of the illumination device 30, to the driver circuit 204. For example, with an increase in duty, the brightness of light emitted from the light source 301 will be increased.

The control unit 203 according to the embodiment performs fade control (fade control process), by reading out a fade control processing program for performing the fade control (fade control process) stored in the storage unit 202, and executing the read fade control processing program.

Upon receiving duty from the control unit 203, the driver circuit 204 generates direct current corresponding to the received duty, by using the DC voltage applied by the AC/DC converter 201. For example, with an increase in the received duty, the driver circuit 204 generates direct current with a large current value. The driver circuit 204 then outputs the generated direct current to the light source 301.

The illumination device 30 includes the light source 301. For example, the light source 301 is implemented by a light emitting diode (LED). The light source 301 is driven by the light source driving device 20, and emits light. More specifically, with an increase in the current value of the direct current from the driver circuit 204, the light source 301 emits light with strong brightness.

Figure 2:
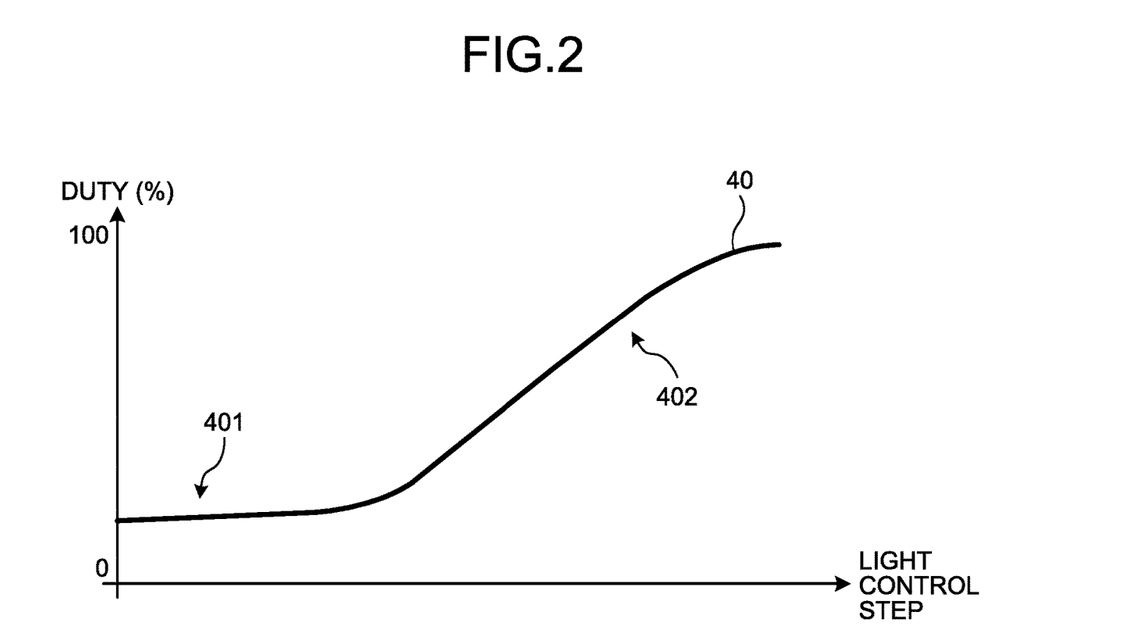
FIG. 2 is a diagram for explaining an example of a dimming curve according to the embodiment.

FIG. 2 is a diagram for explaining an example of a dimming curve 40 according to the embodiment. As illustrated in the example in FIG. 2, the dimming curve 40 is a nonlinear curve indicating a correspondence between a light control step and duty. In general, human can easily recognize change in brightness of dim light than change in brightness of bright light. Thus, as illustrated in FIG. 2, in a range 401 in which the duty of the dimming curve 40 is small, in other words, in the range 401 in which the brightness of relatively dim light is changed, the variation in duty is relatively small with respect to the variation in the light control step. Alternatively, in a range 402 in which the duty of the dimming curve 40 is large, in other words, in the range 402 in which the brightness of relatively bright light is changed, the variation in duty is relatively large with respect to the variation in the light control step. When the fade control is performed by using the dimming curve such as the above, human recognizes the change in brightness such that the variation in the brightness is substantially constant. In other words, human recognizes the natural change in brightness.

The light control step and duty will now be described. For example, the light control step is a level indicating the brightness of light emitted from the light source 301. For example, with an increase in the light control step, the level indicating the brightness of light is increased. Consequently, the duty is also increased.

Moreover, for example, the duty is a control value used when the light with brightness corresponding to the level indicating the brightness of light is emitted from the light source 301.

Figure 3:
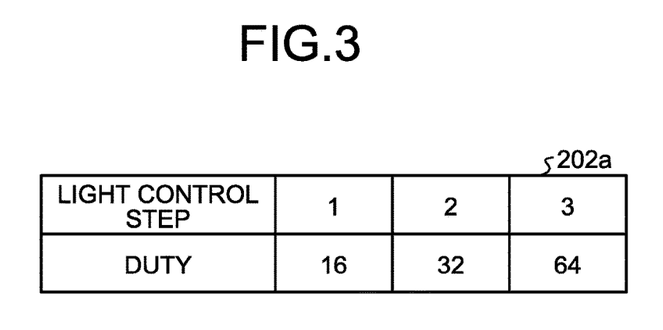
FIG. 3 is a diagram illustrating an example of a data configuration of a fade control table according to the embodiment.

FIG. 3 is a diagram illustrating an example of a data configuration of the fade control table 202a according to the embodiment. The fade control table 202a according to the embodiment registers therein three combinations of a light control step and duty at three separate points on the dimming curve 40. In other words, the storage unit 202 stores therein three combinations of a level indicating the brightness of light emitted from the light source 301 and a control value used when the light with brightness corresponding to the level is emitted from the light source 301, the control value having a nonlinear relation with the level.

The fade control table 202a may also register therein combinations of the light control step and the duty at three or more points on the dimming curve 40. In other words, the storage unit 202 may also store therein three or more combinations of a level indicating the brightness of light emitted from the light source 301 and a control value used when the light with brightness corresponding to the level is emitted from the light source 301, the control value having a nonlinear relation with the level.

As illustrated in FIG. 3, records in the fade control table 202a include items of a "light control step" and "duty". A light control step in the dimming curve 40 is registered in the item of the "light control step". It is to be noted that the light control step registered in the item of the "light control step" is represented by an integer of 0 or more.

Moreover, the light control step within a range that can be used in the fade control is registered in the item of the "light control step". Thus, the remote controller 10 described above receives a light control step among a plurality of light control steps registered in the item of the "light control step" from a user, as a target light control step. For example, the remote controller 10 receives one of light control steps "1", "2", and "3", as a target light control step.

Furthermore, duty corresponding to the light control step registered in the item of the "light control step" in the dimming curve 40 will be registered in the item of the "duty".

For example, in the record at the leftmost end in the fade control table 202a illustrated in FIG. 3, the light control step "1" and duty "16(%)" are registered in an associated manner. Moreover, in the second record from the left, the light control step "2" and duty "32(%)" are registered in an associated manner. Furthermore, in the record at the rightmost end, the light control step "3" and duty "64(%)" are registered in an associated manner.

Figure 4:
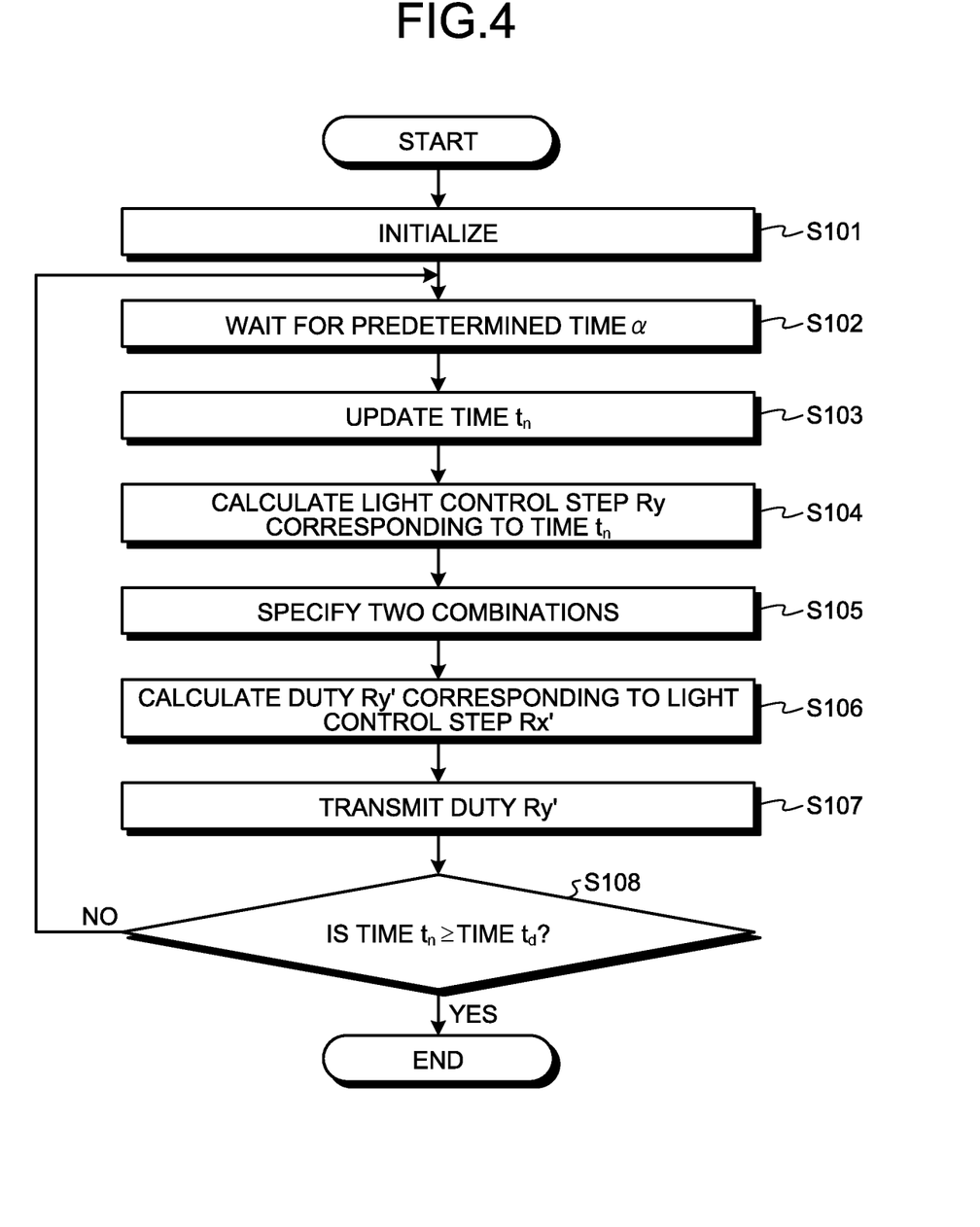
FIG. 4 is a flowchart illustrating a flow of a fade control process executed by a control unit according to the embodiment.

Next, with reference to FIG. 4, a fade control process according to the embodiment will be described. FIG. 4 is a flowchart illustrating a flow of a fade control process executed by the control unit 203 according to the embodiment. The fade control process according to the embodiment is executed when the control unit 203 has received a light control instruction signal from the remote controller 10.

Figure 5:
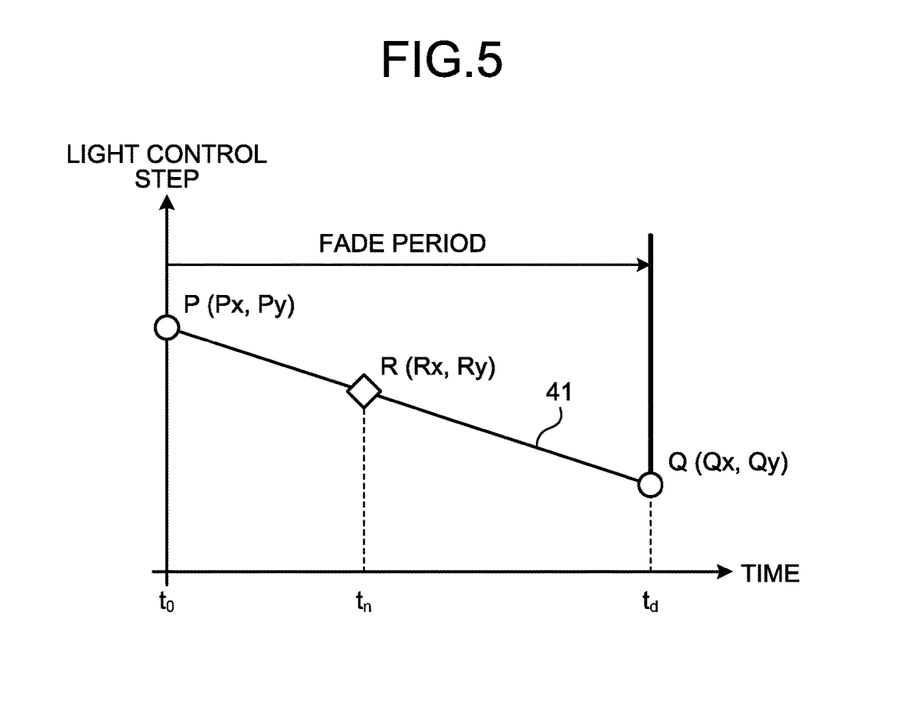
FIG. 5 is a diagram for explaining an example of initializing the fade control process.

As illustrated in FIG. 4, the control unit 203 initializes the fade control process (step S101). FIG. 5 is a diagram for explaining an example of initializing the fade control process. In the example of FIG. 5, the horizontal axis represents time and the vertical axis represents the light control step.

For example, as illustrated in the example of FIG. 5, at step S101, the control unit 203 sets 0 as time (starting time of fade control process) $t_0$ at which the light control instruction signal is received.

Moreover, at step S101, the control unit 203 sets a fade period (for example, two seconds) set in advance in the illumination system 1, as a fade period $t_d$ that is a period (time period) during which the fade control is executed. It is to be noted that the fade period $t_d$ is an example of first time period.

Furthermore, at step S101, the control unit 203 sets 0 as time (starting time of fade control process) Px at which the light control instruction signal is received. Moreover, at step S101, the control unit 203 sets a light control step corresponding to the time Px (time "0") as a light control step Py. In this example, the light control step corresponding to the time Px is a light control step at which a light control instruction signal is received, and the control unit 203 recognizes the light control step at which the light control instruction signal is received. Consequently, the control unit 203 can set the light control step at the time Px as the light control step Py.

Still furthermore, at step S101, the control unit 203 sets the fade period $t_d$ as time Qx at which the execution of the fade control is finished. Still furthermore, at step S101, the control unit 203 sets a target light control step indicated by the input light control instruction signal as a light control step Qy. For example, the control unit 203 sets the target light control step "3" indicated by the light control instruction signal as the light control step Qy.

In an example of FIG. 5, a straight line (line segment) 41 connecting a point P(Px, Py) and a point Q (Qx, Qy) has linearity with respect to the relation between the time and the light control step.

The control unit 203 then waits for a predetermined time period α (for example, α=0.2 seconds) (step S102). The predetermined time period α is time period of an integral multiple of an inverse of driving frequency (1/driving frequency) of the driver circuit 204. The predetermined time period α is also shorter than the fade period $t_d$. The predetermined time period α is an example of second time period.

The control unit 203 then updates the time $t_n$ using the following formula (1) (step S103).

$$t_n = t_{n-1} + \alpha \quad (1)$$

The time $t_n$ represents the elapsed time from the time $t_0$ (time "0"). Moreover, "n" represents an integer of 1 or more.

The control unit 203 then calculates a light control step Ry at the time $t_n$ by the linear interpolation, according to the following formula (2) (step S104).

$$Ry = (Py \times (Qx - Rx) + Qy \times (Rx - Px))/(Qx - Px) \quad (2)$$

In the formula (2), as illustrated in FIG. 5, $Rx = t_n$. The formula (2) is a formula for calculating the light control step Ry at a point R, when the time Rx at the point R is applied on the straight line 41 that passes through the two points of P (Px, Py) and Q (Qx, Qy).

The control unit 203 then specifies two combinations including the light control step adjacent to the light control step calculated at step S104, among the combinations of the light control step and the duty registered in the fade control table 202a (step S105).

A specific process at step S105 will now be described. For example, at step S105, the control unit 203 calculates a light control step (referred to as a round up light control step) Px' being an integer, by rounding up digits after the decimal point of the light control step calculated at step S104. The control unit 203 then specifies a record in which the round up light control step Px' is registered in the item of the "light control step", among all the records in the fade control table 202a. The control unit 203 then specifies duty Py' registered in the item of the "duty" in the specified record. In this manner, the control unit 203 specifies a combination of the round up light control step Px' and the duty Py'.

Moreover, at step S105, the control unit 203 calculates a light control step (referred to as a truncated light control step) Qx' being an integer, by truncating digits after the decimal point of the light control step calculated at step S104. The control unit 203 then specifies a record in which the truncated light control step Qx' is registered in the item of the "light control step", among all the records in the fade control table 202a. The control unit 203 then specifies the duty Qy' registered in the item of the "duty" in the specified record. In this manner, the control unit 203 specifies a combination of the truncated light control step Qx' and the duty Qy'.

A description will now be made on a case in which the light control step calculated at step S104 is "1.2". In this case, at step S105, the control unit 203 calculates the round up light control step "2.0" being an integer, by rounding up digits after the decimal point of the light control step "1.2". Then, at step S105, the control unit 203 specifies a record in which the round up light control step "2.0" is registered in the item of the "light control step", among all the records in the fade control table 202a. Then, at step S105, the control unit 203 specifies the duty "32" registered in the item of the "duty" of the specified record. In this manner, at step S105, the control unit 203 specifies a combination of the round up light control step "2.0" and the duty "32".

Moreover, at step S105, the control unit 203 calculates the truncated light control step "1.0" being an integer, by truncating digits after the decimal point of the light control step "1.2". Then, at step S105, the control unit 203 specifies a record in which the truncated light control step "1.0" is registered in the item of the "light control step", among all the records in the fade control table 202a. Then, at step S105, the control unit 203 specifies the duty "16" registered in the item of the "duty" of the specified record. In this manner, at step S105, the control unit 203 specifies a combination of the truncated light control step "1.0" and the duty "16".

Figure 6:
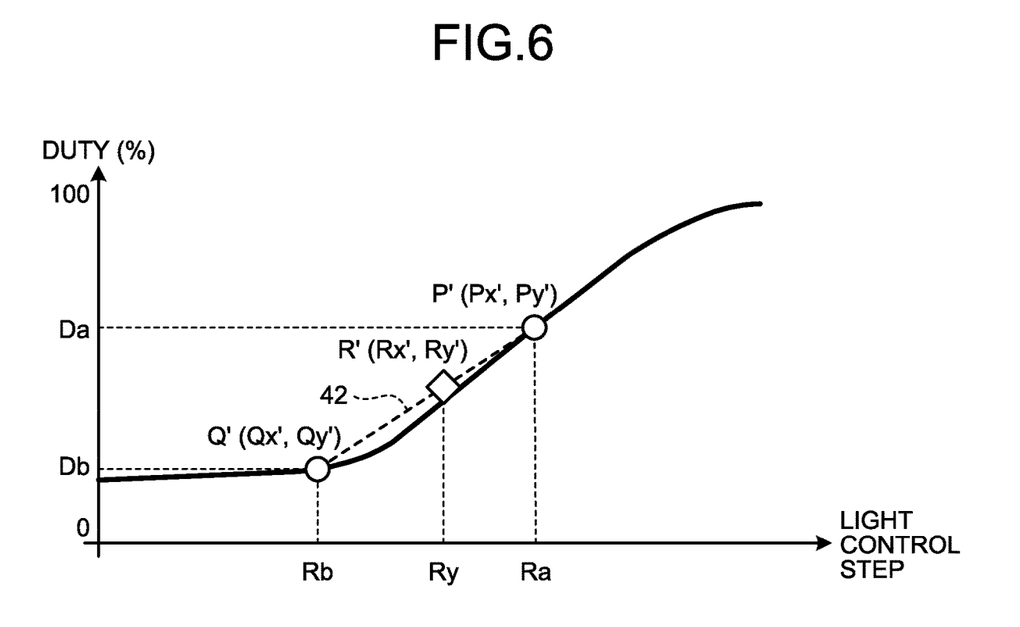
FIG. 6 is a diagram for explaining a process executed by the control unit according to the embodiment.

FIG. 6 is a diagram for explaining a process executed by the control unit 203 according to the embodiment. As illustrated in FIG. 6, a point P' (Px', Py') defined by the combination of the round up light control step Px' and the duty Py', and a point Q' (Qx', Qy') defined by the combination of the truncated light control step Qx' and the duty Qy' are placed on the dimming curve 40. A straight line (line segment) 42 connecting the point P' (Px', Py') and the point Q' (Qx', Qy') has linearity with respect to the relation between the light control step and the duty.

The control unit 203 then calculates duty Ry' corresponding to a light control step Rx' as illustrated in FIG. 6, by the linear interpolation according to the following formula (3) (step S106).

$$Ry' = (Py' \times (Qx' - Rx') + Qy' \times (Rx' - Px'))/(Qx' - Px') \quad (3)$$

In the formula (3), Rx'=Ry. As illustrated in FIG. 6, the formula (3) is a formula for calculating the duty Ry' at the point R', when the light control step Rx' at the point R' is applied on the straight line 42 that passes through the two points of P' (Px', Py') and Q' (Qx', Qy').

The control unit 203 then transmits the duty Ry' calculated at step S106 to the driver circuit 204 (step S107). Thus, in the light control step Rx', the direct current corresponding to the duty Ry' is output to the light source 301.

The control unit 203 then determines whether the time $t_n$ that has passed from the time "0" is equal to or more than the fade period $t_d$ (step S108). When it is determined that the time $t_n$ is less than the fade period $t_d$ (No at step S108), the control unit 203 returns to step S102, and executes the processes from steps S102 to S108 again. In other words, the control unit 203 repeatedly executes the processes from steps S102 to S108, until the time $t_n$ becomes equal to or more than the fade period $t_d$. After the second step S103 and thereafter, the control unit 203 updates the time $t_n$ using the formula (1) described above, while setting the time $t_n$ as time $t_{n-1}$.

In the fade control process described above, the control unit 203 calculates the duty Ry' at the light control step Rx', by using the two combinations including the light control step adjacent to the light control step Rx', among the combinations of the light control step and the duty stored in the storage unit 202, at each light control step Rx' from the light control step Py when the light control instruction signal is supplied, to the target light control step Qy indicated by the light control instruction signal in the fade control.

Moreover, in the fade control process, the control unit 203 calculates the light control step Ry (Rx'), and calculates the duty Ry' corresponding to the calculated light control step Ry, at each predetermined time period α during the fade period $t_d$.

Figure 7:
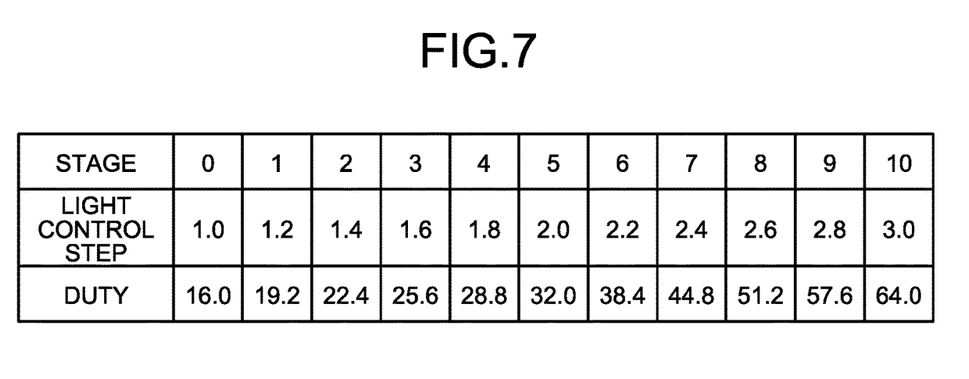
FIG. 7 is a diagram illustrating calculated duty and a light control step corresponding to the duty according to the embodiment.

FIG. 7 is a diagram illustrating the duty Ry' and the light control step Rx' corresponding to the duty Ry' that have been calculated by the control unit 203 according to the embodiment, when the fade control process is performed from the light control step "1.0" to the target light control step "3.0", when α described above is "0.2 seconds", by using the fade control table 202a illustrated in FIG. 3. In FIG. 7, for example, the "stage" is the order when the duty Ry' is calculated.

As illustrated in FIG. 7, the control unit 203 calculates the duty Ry' by the linear interpolation, using the duty "16" corresponding to the light control step "1.0" and the duty "32" corresponding to the light control step "2.0", that are registered in the fade control table 202a, at each predetermined time period α, from the light control step "1.0" to the light control step "2.0". Consequently, the variation in the duty will be "3.2" ((32−16)/5).

Moreover, as illustrated in FIG. 7, the control unit 203 calculates the duty Ry' by the linear interpolation, using the duty "32" corresponding to the light control step "2.0" and the duty "64" corresponding to the light control step "3.0", that are registered in the fade control table 202a, at each predetermined time period α from the light control step "2.0" to the light control step "3.0". Consequently, the variation in the duty will be "6.4" ((64−32)/5).

A description will now be made on a case in which the control unit 203 performs the fade control process from the light control step "1.0" to the target light control step "3.0". In this case, the control unit 203 controls the light source 301 so that the brightness of light emitted from the light source 301 is gradually changed to the brightness corresponding to the level indicated by the supplied light control instruction signal, using the three combinations stored in the storage unit 202. The three combinations in this example include a combination of the light control step "1.0" and the duty "16", a combination of the light control step "2.0" and the duty "32", and a combination of the light control step "3.0" and the duty "64".

The control unit 203 may also control the light source 301 so that the brightness of the light emitted from the light source 301 is gradually changed to the brightness corresponding to the level indicated by the supplied light control instruction signal, using the two or more combinations stored in the storage unit 202. For example, the control unit 203 may also control the light source 301 so that the brightness of the light emitted from the light source 301 is gradually changed from the light control step "1.0" to the light control step "2.0" indicated by the supplied light control instruction signal, by using the stored two combinations. The two combinations in this example include the combination of the light control step "1.0" and the duty "16", and the combination of the light control step "2.0" and the duty "32".

As a comparative example, a description will now be made on a case in which a value obtained by proportionally dividing the difference between the duty of the light control step at the start of fade control and the duty of the target light control step, by the number of steps during the fade period is set as a variation in the duty between the light control steps in the fade control. In other words, a description will now be made on a case in which the duty obtained by stepwise adding (or subtracting) the proportionally divided variation is used at each light control step, from the light control step at the start of the fade control to the target light control step.

Figure 8:
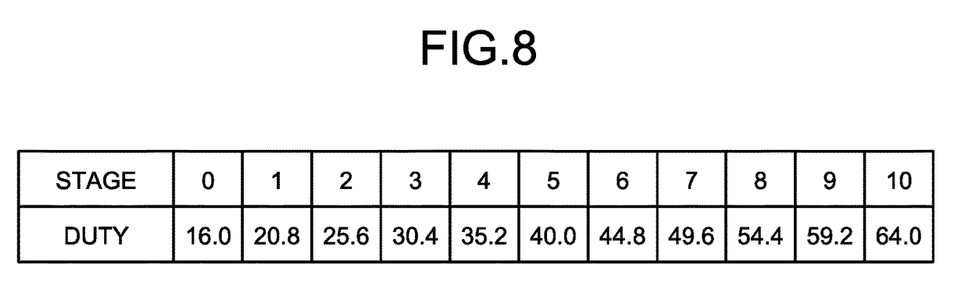
FIG. 8 is a diagram illustrating calculated duty and a light control step corresponding to the duty according to a comparative example.

In such a comparative example, a description will now be made on a case in which the fade control process is performed from the light control step "1.0" to the target light control step "3.0". FIG. 8 is a diagram illustrating an example of the calculated duty and the light control step corresponding to the calculated duty, when the fade control process is performed from the light control step "1.0" to the target light control step "3.0" in the comparative example.

In the comparative example, when the brightness of light emitted from the light source is changed in ten stages per 0.2 seconds, from the light control step "1.0" to the target light control step "3.0", as illustrated in FIG. 8, the variation in the duty becomes constant at "4.8" ((64−16)/10) from the light control step "1.0" to the target light control step "3.0".

The duty Ry' calculated by the light source driving device 20 according to the embodiment illustrated in FIG. 7 and the duty calculated in the comparative example illustrated in FIG. 8 will now be compared. In the comparative example, the duty on the line segment connecting the point corresponding to the light control step at the start of the fade control and the point corresponding to the target light control step on the dimming curve is calculated as duty used in the fade control. Thus, the difference between the calculated duty and the duty on the dimming curve is relatively large. Consequently, in the comparative example, it is difficult to calculate the duty arranged along the dimming curve.

On the other hand, in the embodiment, the control unit 203 of the light source driving device 20 calculates the duty Ry' corresponding to the light control step Rx' (for example, the light control level "1.2" and the light control level "2.4") between the two light control steps Px' and Qx' at each predetermined time period α, by using the two duties Py' and Qy' (for example, "16%" and "32%", or "32%" and "64%") corresponding to the successive two light control steps Px' and Qx' (for example, two light control steps "1" and "2", and two light control steps "2" and "3"). The control unit 203 then controls the light source 301 so that the light of brightness corresponding to the light control step Rx' between the two light control steps Px' and Qx' is emitted, by using the calculated duty Ry' at each predetermined time period α.

In this manner, in the embodiment, the control unit 203 calculates the duty on the line segment connecting the adjacent two points among the three points on the dimming curve 40, as the duty used in the fade control, at each predetermined time period α. Thus, the difference between the calculated duty and the duty on the dimming curve 40 is relatively small. Consequently, the light source driving device 20 according to the embodiment is capable of calculating the duty arranged along the dimming curve 40.

Moreover, in the embodiment, the storage unit 202 stores therein the combinations of the light control step and the duty at three points, instead of a number of points on the dimming curve 40. Thus, the storage unit 202 can be implemented by inexpensive ROM and HDD with small storage capacity, instead of expensive ROM and HDD with large storage capacity. Consequently, with the light source driving device 20 according to the embodiment, it is possible to suppress the increase in cost.

For example, in the embodiment, when the predetermined time period α is $^1/_{1000}$ seconds and the fade period is 1 second, the control unit 203 can calculate the duty 1000 times in the fade control. When the similar process is performed by using the duty stored in advance in the storage unit 202, a storage unit with a storage capacity of 1000 control values needs to be used.

As described above, with the light source driving device 20 according to the embodiment, it is possible to control and gradually change the brightness of light emitted from the light source 301 so that the duty is arranged along the nonlinear curve, while suppressing the increase in cost.

Moreover, in the embodiment described above, the fade period is set in advance in the illumination system 1. However, the fade period may also be variably set by a user. For example, the remote controller 10 receives a fade period with the target light control step from a user. The remote controller 10 may then transmit the fade period with the light control instruction signal indicating the received target light control step to the light source driving device 20, and the control unit 203 of the light source driving device 20 may execute the fade control process by using the fade period received from the remote controller. In other words, the fade period may be time period that is input.

Furthermore, the present invention is not limited to the embodiment described above. The present invention also includes configurations obtained by suitably combining the components described above. Further effects and modifications can be easily derived by those skilled in the art. Thus, the broader aspects of the present invention are not limited to the embodiment described above, and various modifications may be made.

According to an aspect of the present invention, it is possible to control and gradually change the brightness of light emitted from a light source so that the control value is arranged along a nonlinear curve, while suppressing the increase in cost.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A light source driving device, comprising:
   a storage unit that stores therein three or more combinations of a level indicating brightness of light emitted from a light source, and a control value used when light with brightness corresponding to the level is emitted from the light source, the control value having a nonlinear relation with the level; and
   a control unit that controls the light source so that the brightness of the light emitted from the light source is gradually changed to brightness corresponding to a target level indicated by a light control instruction signal during the first time period, by calculating an intermediate level indicating the brightness of the light emitted from the light source between an initial level when a light control instruction signal is supplied and the target level indicated by the light control instruction signal, at each second time period that is shorter than the first time period, by specifying two adjacent levels among the combinations stored in the storage unit, adjacent to the calculated intermediate level, for calculating the control value corresponding to the intermediate level,
   wherein the first time period is a time period in which the brightness of the emitted light has been changed to the target level,
   the first time period comprises two or more successive second time periods, and
   the two adjacent levels adjacent to the intermediate level include a greater level greater than the intermediate level and a smaller level smaller than the intermediate level.

2. The light source driving device according to claim 1, wherein the control unit calculates a control value corresponding to the intermediate level between the adjacent levels, by using two control values corresponding to the two adjacent levels, and controls the light source so that light with brightness corresponding to the intermediate level between the two adjacent levels is emitted by using the calculated control value.

3. The light source driving device according to claim 2, wherein the control unit calculates the control value corresponding to the intermediate level between the two adjacent levels by using the two control values corresponding to the two adjacent levels, and controls the light source so that the light with brightness corresponding to the intermediate level between the two adjacent levels is emitted, by using the calculated control value, and
   the control unit specifies the smaller level by truncating digits after the decimal point of the intermediate level, and specifies the greater level by rounding up digits after the decimal point of the intermediate level.

4. The light source driving device according to claim 3, wherein the first time period is a time period that is input by a user.

5. The light source driving device according to claim 2, wherein the first time period is a time period that is input by a user.

6. The light source driving device according to claim 1, wherein the first time period is a time period that is input by a user.

7. The light source driving device according to claim 1, wherein the first time period is set in advance.

8. The light source driving device according to claim 1, wherein the control unit comprises logic to calculate the control value according to the equation $Ry'=(Py'\times(Qx'-Rx')+Qy'\times(Rx'-Px'))/(Qx'-Px')$, wherein Ry' is the control value, Rx' is the intermediate level, Px' is the greater level, Qx' is the smaller level, Py' is a duty corresponding to the greater level, Qy' is a duty corresponding to the smaller level, and wherein Px', Py', Qx', and Qy' are among the three or more combinations of the level indicating the brightness of light emitted from the light source stored in the storage unit.

* * * * *